(12) United States Patent
Hakenesch

(10) Patent No.: US 6,568,260 B2
(45) Date of Patent: May 27, 2003

(54) METHOD AND APPARATUS FOR DETERMINING AIR FLOW AND PRESSURE DATA OF AN AIRCRAFT OR AERODYNAMIC VEHICLE

(75) Inventor: Peter Hakenesch, Ottobrunn (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/761,659

(22) Filed: Jan. 18, 2001

(65) Prior Publication Data

US 2001/0054311 A1 Dec. 27, 2001

(30) Foreign Application Priority Data

Jan. 18, 2000 (DE) .......................... 100 01 813

(51) Int. Cl.$^7$ .............................................. G01C 21/00
(52) U.S. Cl. ................... 73/178 R; 73/170.02; 73/170.07; 73/170.11
(58) Field of Search .................. 73/178 R, 170.02, 73/170.01, 170.11, 170.07, 170.14, 147; 374/175

(56) References Cited

U.S. PATENT DOCUMENTS

| 4,735,085 A | * | 4/1988 | Meyer | 73/147 |
|---|---|---|---|---|
| 4,857,922 A | * | 8/1989 | Miller et al. | 73/178 |
| 5,001,638 A | * | 3/1991 | Zimmerman et al. | 364/424.06 |
| 5,117,687 A | | 6/1992 | Gerardi | |
| 5,585,557 A | * | 12/1996 | Loschke et al. | 73/170.14 |
| 5,616,861 A | * | 4/1997 | Hagen | 73/170.02 |
| 6,012,331 A | * | 1/2000 | Menzies et al. | 73/180 |
| 6,076,963 A | * | 6/2000 | Menzies et al. | 374/135 |
| 6,250,149 B1 | * | 6/2001 | Black | 73/178 |
| 6,283,407 B1 | * | 9/2001 | Hakenesch | 244/3.21 |

FOREIGN PATENT DOCUMENTS

| DE | 3543431 | 6/1987 |
|---|---|---|
| EP | 0335045 | 10/1989 |

* cited by examiner

Primary Examiner—William Oen
Assistant Examiner—Andre Allen
(74) Attorney, Agent, or Firm—Crowell & Moring LLP

(57) ABSTRACT

A measuring system for determining an air data for an aircraft includes a measuring device for determining measured variables which are a function of the resulting flow vector and the inertia forces acting on a front fuselage section in relation to a rear fuselage section, an acceleration transducer, and an evaluation unit for determining the air data from the measured variables. A storage unit has stored calibration curves for determining an appropriate set of air data by selecting that calibration curve which is most similar to a curve formed from the measured variables.

19 Claims, 5 Drawing Sheets

METHOD AND APPARATUS FOR DETERMINING AIR FLOW AND PRESSURE DATA OF AN AIRCRAFT OR AERODYNAMIC VEHICLE

BACKGROUND AND SUMMARY OF THE INVENTION

This application claims the priority of German patent document 100 1 813.0, filed Jan. 18, 2000, the disclosure of which is expressly incorporated by reference herein.

The invention relates to a method and apparatus for determining air flow and pressure data of a manned or unmanned aircraft or an aerodynamic vehicle.

Conventional air data systems preferably determine the present and local flow angles of an aircraft as well as the present and local static and dynamic pressures, or only some of these values. From these local values so-called undisturbed values are determined in the normal way, i.e. angle of incidence, angle of yaw as well as pressures which are present at the time in the flow which is undisturbed by the aircraft. These undisturbed values serve to determine the attitude and the speed as well as further flight-specific values of the aircraft.

Usually, such conventional air data systems are based on the measurement of pressures, for which pitot pressure sensors, which protrude from the aircraft contour, are used. Furthermore there are measuring devices which measure the pressure distribution at the surface of the nose of the fuselage. Alternative or additional options include the use of angle of incidence transmitters and angle of yaw transmitters of the wind-vane type which also protrude from the aircraft contour. In order to measure flow conditions on the aircraft, it is also possible to use optical laser measuring methods. However, due to their size and complexity, and due also to uncertainty in frequency and extent of the aerosols in the air, such optical laser methods are not suitable for operational use as yet.

The measuring sensors protruding from the aircraft contour are associated with the disadvantage in that they increase the overall resistance of the aircraft. Furthermore, they are also endangered by possible impact from foreign objects, such as birds. There is a further disadvantage in that many aircraft comprise an active onboard radar in the front part of the fuselage nose-section, so that no such measuring sensors can be provided in this region without disturbing the function of the onboard radar. However, placing the measuring sensors in the region behind the front fuselage nose-section requires very considerable calibration and correction effort for operational use.

Measuring the pressure distribution at the front point of the fuselage or at other parts of the aircraft facing the airflow, can also be carried out by pressure sensors integrated in the surface. This technique provides the advantage that it does not increase the overall resistance of the aircraft. Also military detectability of the aircraft as a result of measuring sensors protruding from the aircraft contour is not significantly worsened, due to the small radar signature. This type of measuring sensor, however, does pose the danger that measurements may effectively be changed as a result of, for example, ice formation, dirt or bird strike. Consequently, pressure measurements are considerably affected or even impossible, which may lead to total failure of at least individual sensors and even of the air data system.

It is thus the object of the invention to create a relatively uncomplicated method and apparatus for measuring air data for an aircraft.

Another object of the invention is to provide such a method and apparatus which is substantially resistant to the influence of objects or conditions in the environment of the aircraft.

These and other objects and advantages are achieved by the method and apparatus according to the invention, which includes no components protruding from the fuselage surface of the aircraft, requires no pressure boreholes for measuring the pressure at the surface; and is resistant to the effect of objects or foreign objects as well as to unfavorable environmental conditions. In the measurement system according to the invention, a measuring device is used to measure forces that occur between front and rear fuselage sections of the aircraft. The information is then used to determine the desired air data by comparison with at least one calibration curve. An acceleration sensor is also provided to measure inertial forces which bear on the front fuselage section, for example as a result of aircraft maneuvers.

By integrating the measuring system into the front fuselage region (e.g., in the sectional plane between radome and aircraft fuselage), interference with the onboard radar accommodated in the nose of the fuselage or in the front fuselage section is avoided. Furthermore, with the arrangement of the measuring device according to the invention in the region behind the front fuselage section containing the onboard radar, measuring accuracy is not jeopardized so that system expenditures for measured data correction are increased.

Other objects, advantages and novel features of the present invention will become apparent from the following detailed description of the invention when considered in conjunction with the accompanying drawings.

DETAILED DESCRIPTION OF THE DRAWINGS

Figure 1:
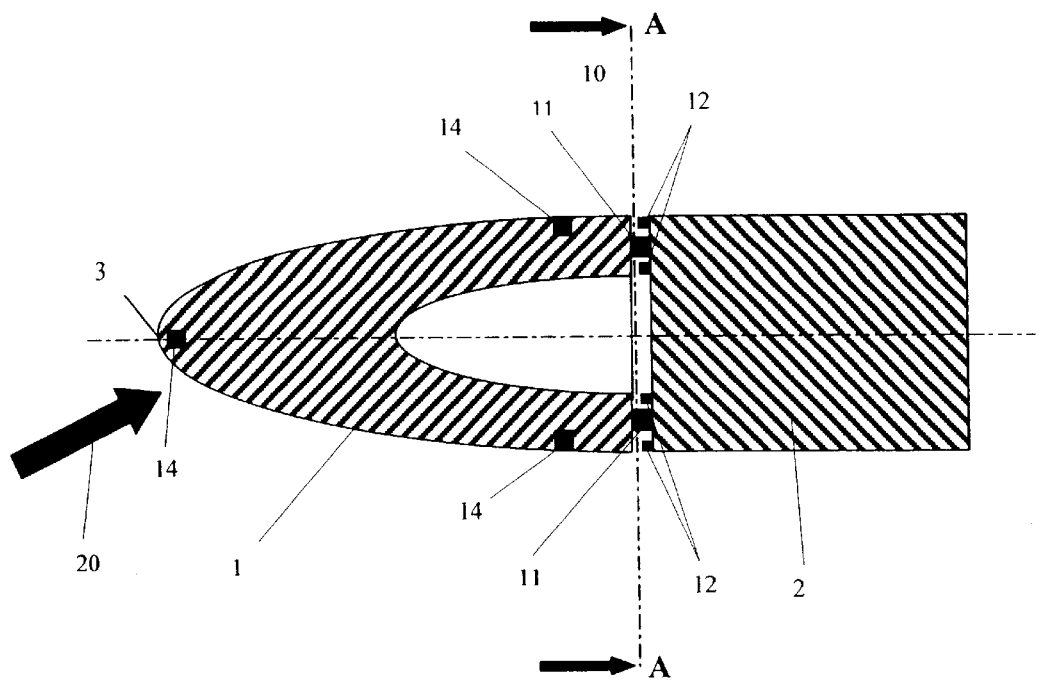
FIG. 1 shows a longitudinal section of the front part of the fuselage of an aircraft with the measuring device according to the invention.

FIG. 1 shows a front fuselage section or fuselage nose-section 1 (when seen in the direction of flight) and a rear fuselage section 2, which together form the front part of an aircraft fuselage. Between the front 1 and the rear 2 fuselage section a measuring device is provided which (at least in sections) is arranged around the circumference, i.e., around at least a measuring section. The measuring device 10 determines an equivalent load gradient in at least one measuring section, which has an extension in circumferential direction so that the measuring section may extend in two dimensions. (In the embodiment according to FIG. 1, the measuring device 10 comprises a force measuring device 11.) Subsequently, from the equivalent load gradient determined by the measuring device (among others by taking into account inertia forces acting on the front fuselage section 1 compared to the rear fuselage section 2), the desired air data are derived by comparison with at least one calibration curve. A set of air data preferably comprises the angle of incidence, the angle of yaw, the static and dynamic pressure as well as a Mach number derived therefrom.

The front fuselage section 1 comprises a front tip 3, which may for example be the radome of an aircraft in which a radar device (not shown) is installed. In this case it is frequently necessary that no further measuring device or no further device (and in particular no air data sensory equipment) be installed in the front fuselage section 1, as this would interfere with the function of a radar device. The rear fuselage section 2 is preferably installed from the front, i.e. in front of the cockpit when seen from the front point 3.

In a first embodiment shown in FIG. 1, for the purpose of load measurement, the front fuselage section 1 and the rear fuselage section 2 can be physically separate components of the fuselage. According to the invention, the forces occurring between the front fuselage section 1 and the rear fuselage section 2 are used to determine the equivalent load gradient. In an alternative second embodiment (not shown), the front fuselage section 1 can be constructed together with the rear fuselage section 2 as a unit; in this case the equivalent load gradient is determined by determining the distribution of strain or stress in the measuring section, (of which there is at least one) between the front fuselage section 1 and the rear fuselage section 2.

In the first embodiment in which the measurement section extends around the entire circumference of the fuselage at the position between the front fuselage section 1 and the rear fuselage section 2, spacers 12 may be arranged, to limit deformation occurring as a result of exterior flight loads and inertia forces, so as to prevent overloading the measuring device 11.

In the area between the front fuselage section 1 and the rear fuselage section 2, additionally guide elements (not shown) can be provided so as to align the front fuselage section 1 relative to the rear fuselage section 2, in particular in radial direction.

Figure 2:
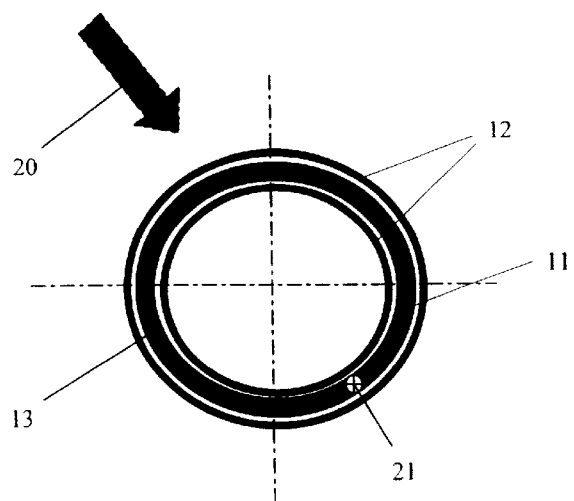
FIG. 2 is a cross-section along line A—A in FIG. 1.

FIG. 2 shows the section A—A through the measuring device 10 (force measuring device 11 in this example) as seen from the front, so that the cross-section 13 of the force measuring device 10 and the arrangement of the spacer elements 12 in relation to the measuring device 10 is shown. The force measuring device 11 determines the load gradient around the measuring section, i.e. in the embodiment according to FIGS. 1 and 2 around the entire circumference of the fuselage. Thus in this case the load gradient represents a force gradient. The cross-section 13 in which the force gradient is measured is preferably within the external contour of the aircraft fuselage at this location. Preferably, the spacers 12 are arranged radially inside and outside the cross section 13 of the force measuring device 11. Alternatively, only one spacer may be arranged radially inside or outside the cross-section 13. The spacers 12 need not extend continuously in the circumferential direction; rather, they can also be arranged at selected points inside or outside along the circumference of the cross-section 13. The spacers 12 can also be designed in another way than that shown in FIG. 1 or 2 according to the state of the art.

Furthermore, in the embodiment according to FIGS. 1 and 2, at least one acceleration transducer 14 is arranged either in the front fuselage section 1 or in the rear fuselage section 2, to determine the inertia forces. The at least one acceleration transducer 14 which act upon the front fuselage section 1, for example as a result of dynamic aircraft maneuvers or structural coupling. This can also be achieved by measuring acceleration at a suitable position in the rear fuselage section 2, using suitable assumptions concerning the weight and the structure of the front fuselage section 1, and a suitable method of estimation to derive the inertia forces at the front fuselage section 1. Inertia measurement is necessary because the measuring device 10 measures both the aerodynamic loads and the inertia forces, while determination of the air data only requires the aerodynamic loads.

In one embodiment only a three-axis acceleration transducer 14 in the front fuselage section 1 is provided which is arranged so as to be spaced apart from the symmetry axis 15 of the fuselage nose-section 1. To improve measurement, further acceleration transducers 14 may be provided in this location in this variant. These are then preferably arranged axial-symmetrically or point-symmetrically in relation to the first-mentioned acceleration transducer 14. In a further variant, several acceleration transducers 14 are arranged in the region of the circumferential area of the fuselage nose-section 1. A single or additional acceleration transducer 14, relatively close to the front point 3, is advantageous in that in the case of longitudinal oscillations, the maximum acceleration in the fuselage nose-section 1 is acquired.

It is the purpose of the measuring device 10 integrated in the fuselage cross-section 13 to determine the force distribution along the circumference. This can for example also be achieved by using wire strain gauges which are arranged in a known way around the circumference or at least part thereof, in the region between the front fuselage section 1 and the rear fuselage section 2. In this case the front fuselage section 1 and the rear fuselage section 2 are constructed as a unit. The underlying measuring principle is based on the change in resistance of a wire due to material expansion. By means of calibration, a respective force can be allocated to such expansion and the resulting change in resistance. To increase the accuracy and to compensate for changes in temperature, the wire strain gauges can be connected together to form a so-called full bridge (Wheatstone bridge). A wire strain gauge full bridge thus represents each individual force measuring point in the measuring cross-section. The redundancy of the measuring system can be increased in line with an increase in measuring positions (i.e., force measuring points), because it can be assumed that the curve of the force in the measuring cross-section can still be determined with sufficient accuracy even if there is a failure of individual measuring points.

A further alternative for force measurement is to use pressure sensors. If the area onto which pressure acts is known, such pressure sensors can also make it possible to determine the overall loads acting on the front fuselage section 1. According to the state of the art, e.g. piezoresistive pressure sensors can be used, in which case the front fuselage section 1 is made as a separate component. The underlying measuring principle of such piezoresistive pressure sensors is based on the piezoresistive effect, i.e. a change in the electrical resistance of crystals if subjected to mechanical stress. Provided the sensor value is known, by way of calibration, the respective pressure load and thus also the respective force can be allocated to this change in resistance. Technical realization of such sensors in the form of monocrystalline silicon, makes it possible to produce miniaturized pressure sensors within the scope of the so-called thin-film technology.

Further options of force measuring are for example the use of capacitive pressure sensors which can also be produced in thin-film technology.

Further options for force measurement include measuring the change in length by means of optical laser measuring methods. In this case, the front fuselage section 1 is also constructed as a separate component. The underlying measuring principle is based on a shift in the interference pattern due to a change in length of the object viewed. By way of calibration, a change in length can be allocated to such a shift in the interference pattern. By way of a further calibration, a mechanical stress or a force can be allocated to such a change in length.

From the point of view of measuring technology, implementation of the measuring method described takes place according to the state of the art.

The function of the invention is described below:

Depending on the current flight direction of the aircraft relative to the air, the force exerted on the front fuselage nose-section 1 can be shown in the form of a resulting flow vector 20 (FIG. 1). Physically, this flow vector 20 results in the application of a force at a point 21 (FIG. 2) at the measuring device 10 or at the cross-section 13 of the force measuring device 10, said cross-section 13 generally being situated axially spaced apart from the longitudinal axis of the fuselage. This results in a certain distribution of an equivalent load extending around the measuring section of the measuring device 10 in the circumferential direction, depending on the angle of incidence, the angle of yaw, the static and dynamic pressure and the Mach number derived therefrom.

Figure 3:
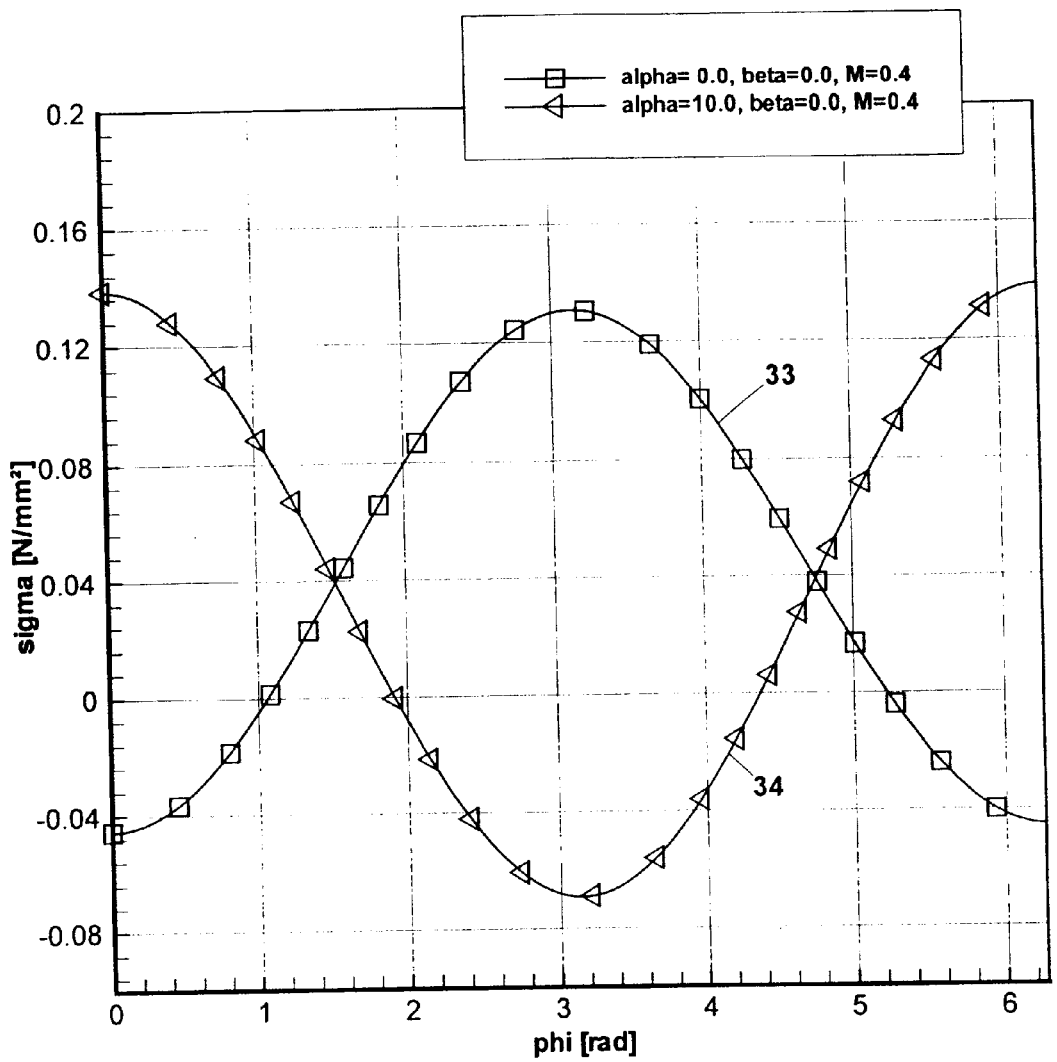
FIG. 3 is a graphic depiction of the stress distribution around the circumference of the measuring cross-section depending on the angle of incidence alpha, the angle of yaw beta and the Mach number M at two different angles of incidence alpha and unchanged Mach number M and unchanged angle of yaw beta.
Figure 4:
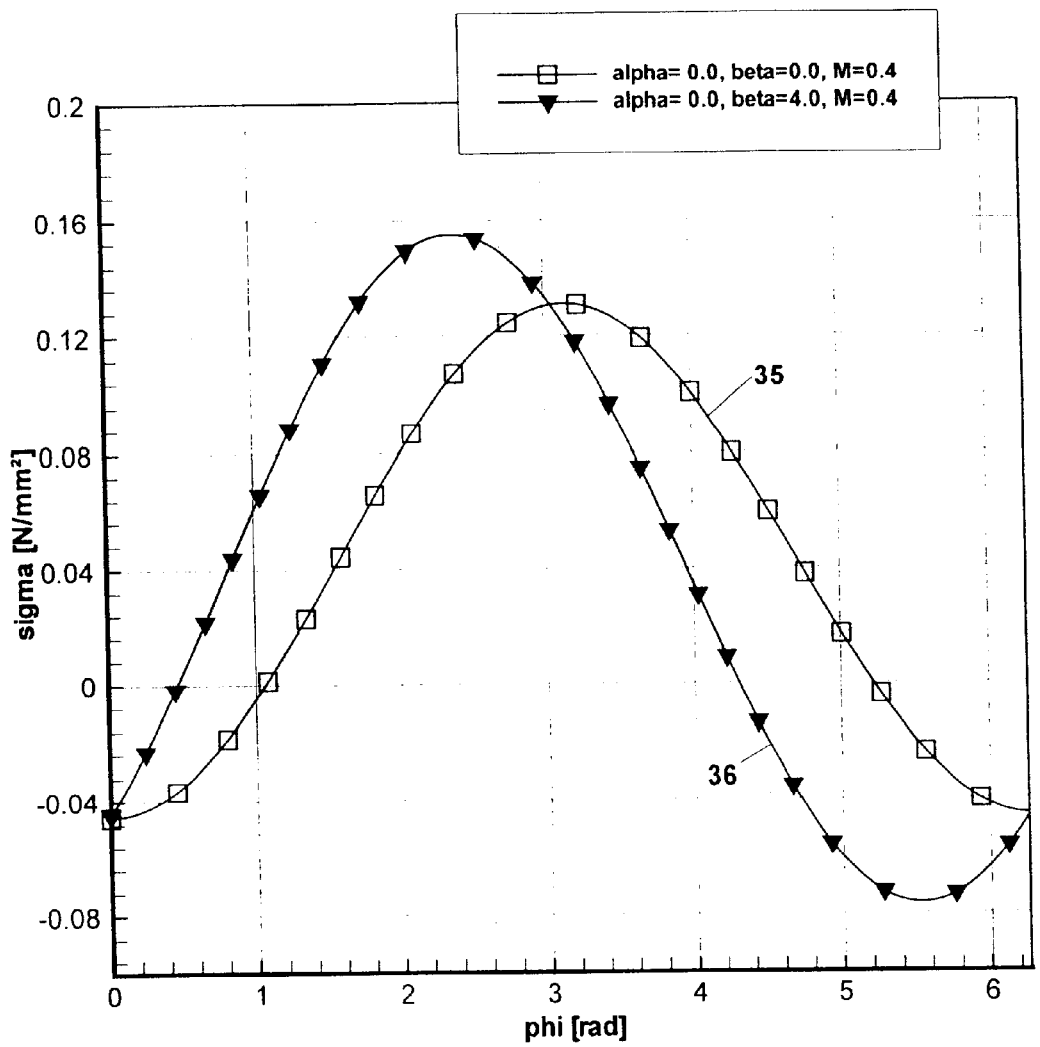
FIG. 4 is a graphic presentation of the stress distribution around the circumference of the measuring cross-section depending on the angle of incidence alpha, the angle of yaw beta, and the Mach number M at two different angles of yaw beta and unchanged Mach number M and unchanged angle of incidence alpha.
Figure 5:
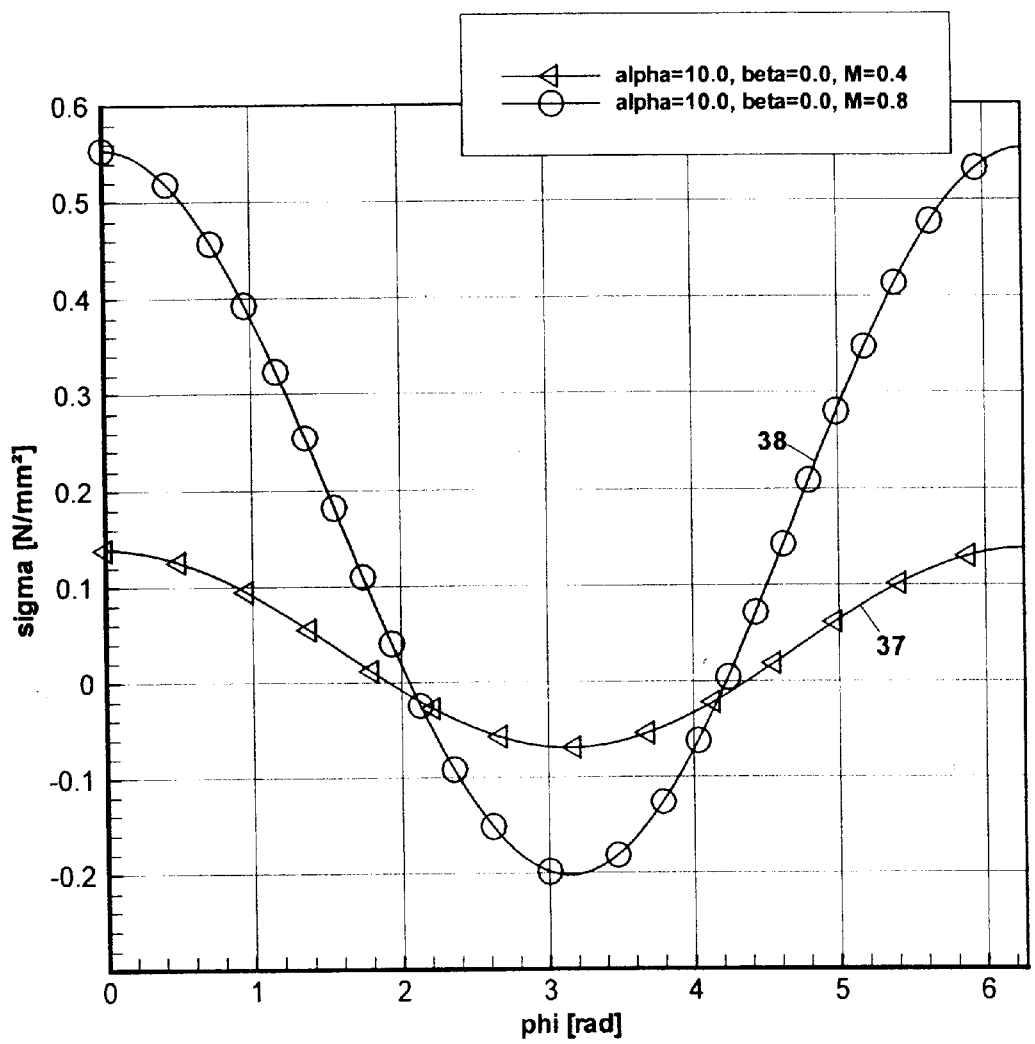
FIG. 5 is a graphic presentation of the stress distribution around the circumference of the measuring cross-section depending on the angle of incidence alpha, the angle of yaw beta, and the Mach number M at two different Mach numbers M and unchanged angle of incidence alpha and angle of yaw beta.

Such a load distribution around the circumference of the measuring section (which in this case is the entire fuselage cross section) can be a force measurement or a stress measurement or a strain measurement, depending on the measuring method or the measuring devices 10 used. FIGS. 3, 4 and 5 show the load distribution for selected parameter values in the example of an assumed aircraft type, so as to illustrate the suitability of the measuring method in respect of unambiguity of the allocation of the measured load-distribution curves to particular flight regimes. The illustration is based on force measurements with a device according to FIGS. 1 and 2.

In FIGS. 3 to 5 the circumferential angle φ(phi) is laid off at the abscissa 31. At the ordinate 32 mechanical stress exerted in the axial direction around the circumference of the measuring cross-section 13 is laid off, said mechanical stress resulting from the flow vector 20 at the respective position indicated by the angle φ at a respective measuring device 10 in the cross-section 13. In the example shown, the stress is laid off around the measuring cross-section in the unit N/mm². Along the abscissa 31, the dimension figures of the angle φ of 0 to 2π are laid off.

In FIG. 3, the curve 33 represents the stress around the measuring cross-section at an angle of incidence of the aircraft of 0 and an angle of yaw of 0. In general, the angle of incidence of the aircraft does not correspond to the airflow angle of the front fuselage section 1 because the airflow angle of the front fuselage section 1 is the direction of free airflow in relation to the symmetry line of the fuselage section 1. In the example shown in FIGS. 3, 4, 5, the symmetry line of the front fuselage section 1 is inclined downwards by 5.5 degrees in relation to the longitudinal axis of the aircraft. Therefore in this example at an aircraft angle of incidence of 0 degrees, a stress fraction results across the measuring cross-section 13, which stress fraction is not constant around the circumference.

Curve 34 shows the distribution of stress along the circumference of the measuring cross-section at a positive angle of incidence α of 10 degrees and at an angle of yaw of zero. The curves 33 and 34 apply to a Mach number of 0.4.

FIG. 4 shows not only the distribution of stress 35 at an angle of incidence of the aircraft of zero and at an angle of yaw of zero, but also a curve 36 with the distribution of stress at an angle of incidence of zero and at an angle of yaw β of 4 degrees. The curves 35 and 36 apply to a Mach number of 0.4.

FIG. 5 shows a curve 37 which represents the distribution of stress along the circumference of the measuring cross-section at a positive angle of incidence of 10 degrees and at an angle of yaw of zero at a Mach number of 0.4. Curve 37 corresponds to curve 34 in FIG. 3 in another scale. Curve 38 of FIG. 5 shows the distribution of stress for an angle of incidence of 10 degrees, for an angle of yaw of 0 degrees and a Mach number of 0.8.

FIGS. 3, 4, and 5 show that there is a characteristic distribution of stress for each flight regime. Conversely, when carrying out and evaluating the measuring process in flight, a conclusion concerning a flight regime is arrived at from a measured load gradient or distribution of stress gradient. For this purpose, there are calibration curves for each flight regime being considered. For example, these calibration curves can be stored in an onboard computer. In an alternative implementation they can also be present in an earth station with comparison of the curves taking place via telemetry data transmission. This implementation can be advantageous in particular in the case of unmanned aircraft or space vehicles.

The distribution of stress or load gradients shown as an example in FIGS. 3, 4 and 5 which occur in the measuring cross-section 13, does not yet allow any direct unambiguous determination of the sought measuring values, i.e. in particular angle of incidence α, angle of yaw β, and speed v or dynamic pressure q, because the course of the measuring curve depends on these three sought measuring values and additionally on the acceleration forces acting on the front fuselage section 1. In this, it is to be assumed that the speed v, the dynamic pressure q, and the Mach number M are equivalent values. For conversion according to known formulae, the static temperature and the static air pressure by which the so-called pressure height is defined, are to be taken into account. In a first step therefore, the forces measured in the measuring cross-section 13 are to be separated from the inertia forces measured by means of acceleration transducers, said inertia forces acting on the front fuselage section 1. The forces which act upon the fuselage section 1 due to the aerodynamic load are determined in this way. Within the scope of calibration, all combinations of α, β, v or q which can occur within the flight envelope for a particular flight regime, and the resulting distribution of stress occurring in the measuring cross-section 13, are to be determined and stored in a database.

The load distribution occurring in the measuring section during the flight is continuously compared to the calibration curves stored in the database. The calibration curve which is most similar to the load curve measured in flight, is used to allocate the desired measured variable to the present flight regime.

Determination of the calibration curve which is most similar to the curve measured in flight that has been modified by the inertia forces, is for example, possible according to the known method of the least squares.

Figure 6:
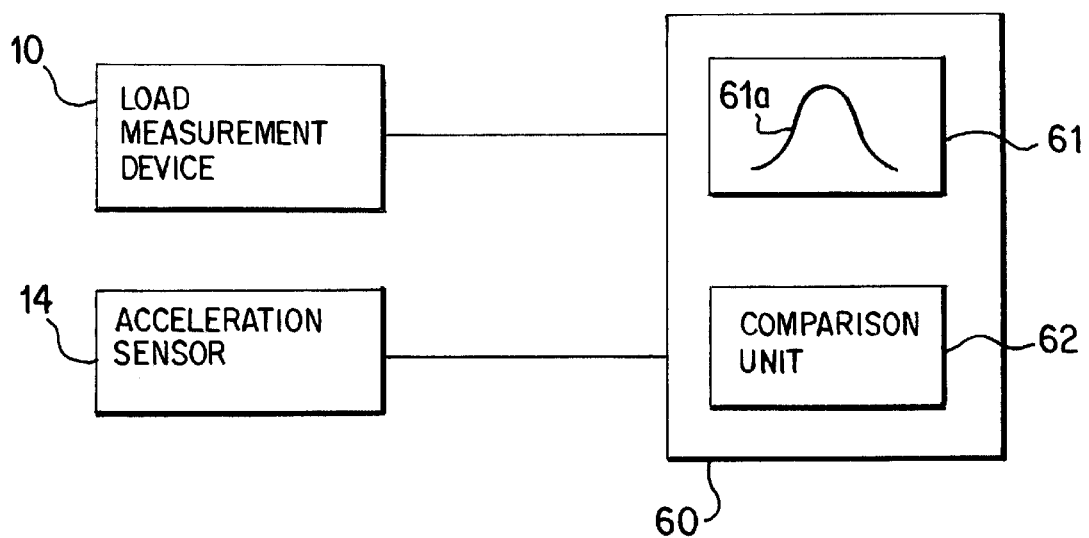
FIG. 6 is a schematic block diagram of the measurement system according to the invention.

FIG. 6 is a schematic diagram which shows the components of a measurement system according to the invention. A stress or load measurement device 10 detects the circumferential distribution of stress forces between front and rear fuselage sections as shown in FIG. 1, while an acceleration sensor 14 measures acceleration of the aircraft along three axes, as described previously. The output measurement signals from the stress measurement device 10 and the acceleration sensor 14 are provided to the evaluation unit 60, which may be a conventional data processor. The evaluation unit 60 includes a memory 61 which stores calibration curves 61a, and a comparison unit 62. As described above, the comparison unit compares a stress distribution curve determined from measurement signals from the stress measurement device 10 with the stored calibration curves 61a. The evaluation unit 61 determines which calibration curve corresponds most closely to the measured data, taking into account the acceleration measurement information from the sensor 18.

Determining the associated calibration curve which correctly describes the flight regime can further be optimized by using a calibration curve that agrees with a curve measured in flight at the measuring point in time $t_1$, as a starting solution when seeking the calibration curve in the subsequent measuring point in time $t_2$. This procedure is based on the assumption that within the measuring time interval $dt=t_2-t_1$, the aerodynamic vehicle can only take up positions in space which can be near the position known at the point in time $t_1$. After identification of the correct calibration curve, the values which describe the flight regime at the measuring point in time $t_2$ are again used as starting values when looking for a solution for measuring point in time $t_3$. The possibilities to be considered can further be reduced by using the motion equations valid for the aerodynamic vehicle. This means that when there is a known starting position for the sought values angle of incidence $\alpha$, angle of yaw $\beta$, and Mach number M at a point in time $t_1$, no longer can any number of solutions be considered. Rather, the solution for the point in time $t_2$ can be extrapolated from the path data at the point in time $t_1$ to the point in time $t_2$, in this way providing a first approximation.

With technical system implementation in the aircraft, the measuring device 10 supplies signals which for example transmit the present angle of incidence, the present angle of yaw and the present dynamic pressure, for example to a signal pre-processor and from there via analogue or digital lines to an air data system which in turn is coupled to a flight control system with actuators and with control devices in the cockpit as well as to other systems or system functions.

With the device according to the invention or the method according to the invention, other physical values too can be determined which can be derived from measured and consolidated values according to known methods.

In order to meet safety requirements, both mechanical components of the measuring device 10 and their electrical components can be provided several times.

It is also possible to use measuring devices other than those mentioned in order to acquire the course of an equivalent load around the measuring section provided. A combination of various types of measuring devices can also be provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A measuring system for determining air data for an aircraft, having a measuring device for determining values for measured variables, and an evaluation unit associated with said measuring device, for determining the air data from the measured variables, wherein:

the measuring device comprises a force measuring device, which is arranged between front and rear portions of a fuselage of the aircraft in a transverse measuring section extending at least partly around a circumference of the aircraft, and acquires measured variables that are indicative of a load gradient exerted within the aircraft fuselage, which load gradient is a function of a flow vector of an air flow impinging on the aircraft, and of the inertia forces, both of which act on the front fuselage portion of the air craft in relation to the rear fuselage portion;

the measuring device further includes at least one acceleration transducer arranged in the aircraft, for determining inertia forces acting on a front fuselage portion of the aircraft;

the evaluation unit includes a storage unit with stored calibration curves and a comparison unit which compares at least one calibration curve with a measurement curve determined from the measured variables acquired, so as to select that calibration curve which is most similar to the measurement curve, for determining said air data.

2. The measuring system according to claim 1, wherein:

the front fuselage portion and the rear fuselage portion together constitute a single piece; and the measuring device comprises a plurality of wire strain gauges distributed around the circumference, said wire strain gauges being coupled to the evaluation unit.

3. The measuring system according to claim 2, wherein the measuring device comprises piezoresistive pressure measurement sensors.

4. The measuring system according to claim 1, wherein:

the measuring section extends around an entire circumference of the aircraft;

the front fuselage portion and the rear fuselage portion are separate components of a fuselage of the aircraft.

5. The measuring system according to claim 1, wherein the measuring device comprises capacitive pressure measurement sensors.

6. The measuring system according to claim 1, wherein:

a first acceleration transducer is arranged off-center in the front fuselage portion; and a further acceleration transducer is preferably arranged axial-symmetrically or point-symmetrically in relation to the first acceleration transducer.

7. The measuring system according to claim 1, wherein a plurality of acceleration transducers are arranged around the circumference of a fuselage nose-section 1.

8. A method for determining a set of air data of an aircraft comprising a front fuselage section and a rear fuselage section, at least one acceleration transducer arranged in a fuselage section, a measuring device, arranged in a measuring section between the front fuselage section and the rear fuselage section, for acquiring measured data, and an evaluation unit for determining air data from the measured data, said method comprising the acts of:

determining the measured data in the measuring section;

determining inertia forces acting upon the front fuselage portion by means of the acceleration transducer;

determining an equivalent load gradient occurring in the measuring section which arises as a result of an aerodynamic load acting on the front fuselage portion;

comparing said equivalent load gradient with at least one of a plurality of stored calibration curves allowing a correlation of possible combinations of air data in the measuring section which have equivalent load gradients;

selecting a calibration curve which is most similar to the curve measured during flight; and determining a set of air data from the selected calibration curve.

9. The method according to claim 8, wherein a separation takes place by means of measuring the inertia forces acting upon the front fuselage section.

10. The method according to claim 8, wherein a separation takes place by means of measuring the acceleration of the rear fuselage section of the aircraft.

11. The method according to claim 8, wherein as a starting solution for selecting calibration curves to be compared, a calibration curve is used which has been selected as an appropriate solution in a preceding iteration step.

12. The method according to claim 8, wherein for selecting the calibration curve, movement equations applicable to the aircraft are also used, so as to extrapolate a set of air data of a respective relevant point in time from a set of air data from a preceding point in time, using path data, which via correlation form an approximation for selecting the calibration curve.

13. A method for determining air data flow for an aircraft having a front fuselage section and a rear fuselage section, said method comprising the acts of:

measuring forces occurring between the front fuselage section and the rear fuselage section;

determining an equivalent load gradient between the front fuselage section and the rear fuselage section based on measured forces between the front and rear fuselage sections;

comparing said equivalent load gradient with calibration curves stored in a memory;

selecting a calibration curve which correlates most closely with the equivalent load curve; and determining a set of air flow data from the selected calibration curve.

14. The method according to claim 13, further comprising the acts of:

measuring inertia forces acting on said aircraft; and modifying said equivalent load gradient as a function of measured inertia forces.

15. The method according to claim 13, wherein said act of measuring comprises measuring a distribution of forces at points around a circumference of the aircraft in a substantially transverse measurement plane.

16. A system for determining air flow data for an aircraft having a front fuselage section and a rear fuselage section, comprising:

a first sensor for measuring forces occurring between the front fuselage section and the rear fuselage section; and an evaluation unit coupled to receive measured force values from said first sensor, said evaluation unit comprising a data processor that is coupled in communication with a memory having a plurality of calibration curves stored therein;

wherein said evaluation unit determines an equivalent load gradient between the front fuselage section and the rear fuselage section based on measured forces between the front and rear fuselage sections;

compares said equivalent load gradient with calibration curves stored in the memory;

selects a calibration curve which correlates most closely with the equivalent load curve; and determines a set of air flow data from the selected calibration curve.

17. The system according to claim 16, further comprising a second sensor for measuring inertia forces acting on said aircraft, wherein:

said evaluation unit modifies said equivalent load gradient as a function of measured inertia forces.

18. The system according to claim 16, wherein said first sensor measures a distribution of forces at points around a circumference of the aircraft in a substantially transverse measurement plane.

19. The measuring system according to claim 1, wherein said force gradient comprises a peripheral distribution around the measuring section, of forces exerted between said front and rear portions of the fuselage of the aircraft.

* * * * *